United States Patent
Lin et al.

(10) Patent No.: US 10,912,060 B2
(45) Date of Patent: Feb. 2, 2021

(54) DATA TRANSMISSION METHOD, NETWORK DEVICE AND TERMINAL DEVICE

(71) Applicant: GUANGDONG OPPO MOBILE TELECOMMUNICATIONS CORP., LTD., Guangdong (CN)

(72) Inventors: Yanan Lin, Dongguan (CN); Hua Xu, Ottawa (CA)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/308,433

(22) PCT Filed: Oct. 19, 2016

(86) PCT No.: PCT/CN2016/102635
§ 371 (c)(1),
(2) Date: Dec. 7, 2018

(87) PCT Pub. No.: WO2018/072159
PCT Pub. Date: Apr. 26, 2018

(65) Prior Publication Data
US 2019/0261318 A1    Aug. 22, 2019

(51) Int. Cl.
*H04W 72/02*    (2009.01)
*H04L 1/00*    (2006.01)
(Continued)

(52) U.S. Cl.
CPC .......... *H04W 72/02* (2013.01); *H04L 1/0061* (2013.01); *H04L 1/1812* (2013.01);
(Continued)

(58) Field of Classification Search
CPC ... H04L 5/0091; H04L 1/1893; H04L 5/0053; H04L 1/0061; H04L 1/1812;
(Continued)

(56) References Cited

U.S. PATENT DOCUMENTS 8,874,164 B2    10/2014   Batchu et al.
2013/0176856 A1    7/2013   Wang et al.
(Continued)

FOREIGN PATENT DOCUMENTS

CN    104136932 A    11/2014
CN    104322132 A    1/2015
(Continued)

OTHER PUBLICATIONS

The extended European search report for the corresponding EP patent aplication No. 16919577.3, dated Jul. 5, 2019.
(Continued)

*Primary Examiner* — Natasha W Cosme
(74) *Attorney, Agent, or Firm* — Ladas & Parry, LLP

(57) ABSTRACT

A data transmission method, a network device and a terminal device are provided. The method includes that: a network device receives data which is transmitted by a terminal device on multiple transmission resources without grant; and the network device independently decodes the data on each transmission resource in the multiple transmission resources.

19 Claims, 6 Drawing Sheets

(51) Int. Cl.
*H04L 1/18* (2006.01)
*H04W 8/24* (2009.01)
*H04W 72/12* (2009.01)
*H04W 72/04* (2009.01)

(52) U.S. Cl.
CPC ............ *H04L 1/1893* (2013.01); *H04W 8/24* (2013.01); *H04W 72/04* (2013.01); *H04W 72/1284* (2013.01); *H04L 1/1887* (2013.01)

(58) Field of Classification Search
CPC ... H04L 1/1896; H04L 5/0055; H04L 5/0098; H04L 5/001; H04L 5/0048; H04L 1/0026; H04L 1/08; H04L 1/1671; H04L 1/1822; H04L 1/1887; H04L 5/0007; H04L 1/0003; H04L 1/1854; H04L 1/1861; H04L 1/188
See application file for complete search history.

(56) References Cited

U.S. PATENT DOCUMENTS

| | | |
|---|---|---|
| 2014/0192767 A1 | 7/2014 | Au et al. |
| 2014/0254544 A1 | 9/2014 | Kar Kin Au et al. |
| 2016/0219627 A1 | 7/2016 | Au et al. |
| 2017/0195088 A1 | 7/2017 | Uchino et al. |

FOREIGN PATENT DOCUMENTS

| | | |
|---|---|---|
| CN | 104838713 A | 8/2015 |
| CN | 105284172 A | 1/2016 |
| EP | 2929744 A1 | 10/2015 |
| WO | 2016158087 A | 10/2016 |

OTHER PUBLICATIONS

Samsung: "Discussion on grant-free/content-based non-orthogonal multiple access", 3GPP Draft; R1-166752,3rd Generation Partnership Project(3GPP), Mobile Competence Centre;650, Route Des Lucioles; F-06921 Sophia-Antipolis Cedex; France, vol. RAN WG1, No. Gothenburg, Sweden; Aug. 22, 2016-Aug. 26, 2016,Aug. 21, 2016(Aug. 21, 2016), XP051140361.

Huawei et al: "The retransmission and HARQ schemes for grant-free", 3GPP Draft; R1-1608859, 3rd Generation Partnership Project(3GPP), Mobile Competence Centre; 650, Route Des Lucioles; F-06921 Sophia-Antipolis Cedex; France, vol. RAN WG1, No. Lisbon, Portugal; Oct. 10, 2016-Oct. 14, 2016. Oct. 14, 2016(Oct. 14, 2016), XP051159186.

The Communication pursuant to Article 94(3) EPC of the corresponding EP patent application No. 16919577.3, dated Apr. 9, 2020.

The first office action of the corresponding TW patent application No. 106130402, dated Jun. 19, 2020.

The first office action of the corresponding CN patent application No. 201680087390.8, dated Aug. 16, 2019.

3GPP TSG RAN WG1 Meeting #86bis, Discussion on grant-free transmission based on sensing, R1-1609801, Lisbon, Portugal, Oct. 10-14, 2016.

Examination Report of the corresponding Indian patent application No. 201817046438, dated Nov. 11, 2020.

DATA TRANSMISSION METHOD, NETWORK DEVICE AND TERMINAL DEVICE

CROSS-REFERENCE TO RELATED APPLICATION

The present application is the U.S. national phase application of the PCT Application No. PCT/CN2016/102635 filed on Oct. 19, 2016, the disclosure of which is incorporated herein in its entirety by reference.

TECHNICAL FIELD

Embodiments of the present disclosure relate to the field of wireless communication, and more particularly to a data transmission method, a network device and a terminal device.

BACKGROUND

In a present 5th-Generation (5G) New Radio (NR) system, grant free uplink transmission, i.e., uplink transmission without grant, is supported. That is, a terminal having data to be transmitted may autonomously transmit the data without waiting for a grant of a base station. Such a transmission manner is favorable for reducing a control signaling overhead in the system, reducing an end-to-end delay and reducing power consumption of the terminal, and thus is particularly applicable to a low-frequency small-data-packet service, a service with a low delay requirement and the like. One of problems this transmission manner has is that, since the data is not transmitted under the grant of the base station, the base station, when receiving the data, does not know about a specific physical resource adopted by the terminal and thus a complex receiving solution is required.

SUMMARY

The embodiments of the present disclosure provide a data transmission method, a network device and a terminal device, which may solve a problem of relatively high receiving complexity caused by a fact that the network device does not know about physical resource information adopted for data transmission of the terminal device.

A first exemplary embodiment provides a data transmission method, including that:

a network device receives data which is transmitted by a terminal device on by a terminal device, the network device does not need to acquire a position of each transmission resource for unified decoding after receiving the data which is transmitted by the terminal device on each transmission resource, thereby reducing the receiving complexity at the network device.

It is to be understood that the terminal device maps the data to be transmitted onto the multiple transmission resources and may independently encode the data mapped onto each transmission resource. Furthermore, the terminal device may also perform independent interleaving processing on the data mapped onto each transmission resource.

As another exemplary embodiment, each transmission resource may include at least one resource unit.

In the exemplary embodiment, when each transmission resource includes one resource unit, system flexibility is relatively high. Taking into consideration a specific network condition or a data transmission condition during a practical application, each transmission resource may alternatively include multiple resource units.

As another exemplary embodiment, an index number P of a starting resource unit in each transmission resource may meet P mod N=k, N being a quantity of resource units in each transmission resource and k being a preset non-negative integer smaller than N.

A value of k may be pre-agreed by the terminal device and the network device, for example, specified by a protocol, and may alternatively be configured and notified to the terminal device by the network device.

As another exemplary embodiment, the at least one resource unit may be continuous or discontinuous in a frequency domain.

As another exemplary embodiment, the multiple transmission resources may be continuous or discontinuous in a frequency domain.

As another exemplary embodiment, before the operation that the network device receives the data which is transmitted by the terminal device on the multiple transmission resources without grant, the method may further include that: the network device determines positions of the multiple transmission resources according to an Identifier (ID) of the terminal device.

For example, according to the position of a first transmission resource, the ID of the terminal device and a predetermined algorithm or formula, the network device may determine positions of the other transmission resource.

As another exemplary embodiment, before the operation that the network device receives the data which is transmitted by the terminal device on the multiple transmission resources without grant, the method may further include that: the network device determines a position of at least one resource unit in each transmission resource according to an ID of the terminal device.

For example, according to the position of a first transmission resource in the multiple transmission resources, the ID of the terminal device and the predetermined algorithm or formula, the network device may determine positions of the other transmission resources.

As another exemplary embodiment, before the operation that the network device independently decodes the data on each transmission resource in the multiple transmission resources, the method may further include that: the network device receives, on a specific time-frequency resource in each transmission resource, decoding information used for decoding the data on each transmission resource; and the operation that the network device decodes the data on each transmission resource in the multiple transmission resources may include that: the network device independently decodes the data on each transmission resource according to the decoding information used for decoding the data on each transmission resource.

As another exemplary embodiment, the decoding information may include at least one of: a Modulation and Coding Scheme (MCS) corresponding to each transmission resource, precoding information corresponding to each transmission resource, reference signal information corresponding to each transmission resource, and a size of each transmission resource.

As another exemplary embodiment, the data on the multiple transmission resources may belong to a same Hybrid Automatic Retransmission Request (HARQ) process.

The solution of the exemplary embodiment is relatively easy to implement. However, if the data on a transmission resource, for example, a transmission resource 1, fails to be decoded, the data transmitted without grant on all the transmission resources in a corresponding time unit, i.e., the transmission resource 1, a transmission resource 2 and a transmission resource 3, is suggested to be retransmitted.

As another exemplary embodiment, the data on each transmission resource may include at least one of: a total quantity of the multiple transmission resources, index numbers of other transmission resources, except a current transmission resource, in the multiple transmission resources, and position information of the other transmission resources.

As another exemplary embodiment, the data on the multiple transmission resources may include at least one common Cyclic Redundancy Check (CRC) code.

That is, the network device receives the data transmitted in the uplink transmission manner without grant on the multiple transmission resources. In addition to a CRC code specific for and carried in the data on each transmission resource, the multiple transmission resources also include at least one unified CRC code. Positions and the quantity of common CRC codes are not limited in the embodiments of the present disclosure. The common CRC code may be located on any of the multiple transmission resources.

As another exemplary embodiment, the data on each transmission resource in the multiple transmission resources may belong to an independent HARQ process.

According to the solution of the exemplary embodiment, the system complexity is improved. However, if the data on a transmission resource, for example, the transmission resource 1, fails to be decoded while the data on the other transmission resources, for example, the transmission resource 2 and the transmission resource 3, are successfully decoded, the terminal device may only retransmit the data on the transmission resource 1.

As another exemplary embodiment, the data on each transmission resource may include at least one of: information about a HARQ process number corresponding to data transmission on each transmission resource; and position information of other transmission resources, except a current transmission resource, in the multiple transmission resources.

A second exemplary embodiment provides a network device, which may be configured to execute each process executed by the network device in the data transmission method in the first exemplary embodiment and various implementation modes thereof. The network device includes a receiving unit and a processing unit. The receiving unit is configured to receive data which is transmitted by a terminal device on multiple transmission resources without grant. The processing unit is configured to independently decode the data, received by the receiving unit, on each transmission resource in the multiple transmission resources.

A third exemplary embodiment provides a network device, which may be configured to execute each process executed by the network device in the data transmission method in the first exemplary embodiment and various implementation modes thereof. The network device includes a receiver and a processor. The receiver is configured to receive data which is transmitted by a terminal device on multiple transmission resources without grant. The processor is configured to independently decode the data, received by the receiver, on each transmission resource in the multiple transmission resources.

A fourth exemplary embodiment provides a system chip, which includes an input interface, an output interface, a processor and a memory. The processor is configured to execute a code stored in the memory, and when the code is executed, the processor may implement each process executed by a network device in the data transmission method in the first exemplary embodiment and various implementation modes thereof. In the exemplary embodiment, the input interface is configured to receive data which is transmitted by a terminal device on multiple transmission resources without grant. The processor is configured to independently decode the data, received by the input Interface, on each transmission resource in the multiple transmission resources.

A fifth exemplary embodiment provides a data transmission method, including that:

a terminal device independently encodes data to be transmitted on each transmission resource in multiple transmission resources; and the terminal device transmits the independently encoded data to a network device on each transmission resource without grant.

The terminal device maps the data to be transmitted onto the multiple transmission resources, independently encodes the data mapped onto each transmission resource and then transmits the data to the network device without grant, so that the network device, after receiving the data on each transmission resource, may independently decode the data on each transmission resource, thereby reducing the receiving complexity at the network device.

Each transmission resource may include at least one resource unit.

As another exemplary embodiment, an index number P of a starting resource unit in each transmission resource may meet P mod N=k, N being a quantity of resource units in each transmission resource and k being a preset non-negative integer smaller than N.

A value of k may be pre-agreed by the terminal device and the network device, for example, specified by a protocol, and may alternatively be configured and notified to the terminal device by the network device.

As another exemplary embodiment, the at least one resource unit may be continuous or discontinuous in a frequency domain.

As another exemplary embodiment, the multiple transmission resources may be continuous or discontinuous in a frequency domain.

As another exemplary embodiment, before the operation that the terminal device independently encodes the data to be transmitted on each transmission resource in the multiple transmission resources, the method may further include that: the terminal device determines positions of the multiple transmission resources according to an ID of the terminal device.

For example, the terminal device may autonomously select the position of a first transmission resource first and determine the positions of the other transmission resources according to the position of the first transmission resource, the ID of the terminal device and a predetermined algorithm or formula.

As another exemplary embodiment, before the operation that the terminal device independently encodes the data to be transmitted on each transmission resource in the multiple transmission resources, the method may further include that: the terminal device determines a position of at least one resource unit in each transmission resource according to an ID of the terminal device.

For example, the terminal device may determine the position of the resource unit in each transmission resource according to the ID of the terminal device and the predetermined algorithm or formula.

As another exemplary embodiment, the method may further include that: the terminal device transmits, on a specific time-frequency resource in each transmission resource, decoding information used for decoding the data on each transmission resource to the network device.

As another exemplary embodiment, the decoding information may include at least one of: an MCS corresponding to each transmission resource, precoding information corresponding to each transmission resource, reference signal information corresponding to each transmission resource, and a size of each transmission resource.

As another exemplary embodiment, the data on the multiple transmission resources may belong to a same HARQ process.

As another exemplary embodiment, the data on each transmission resource may include at least one of: a total quantity of the multiple transmission resources, index numbers of other transmission resources, except a current transmission resource, in the multiple transmission resources, and position information of the other transmission resources.

As another exemplary embodiment, the data on the multiple transmission resources may include at least one common CRC code.

That is, the terminal device maps the data to be transmitted in the uplink transmission manner without grant onto the multiple transmission resources. In addition to a CRC code specific for and carried in the data on each transmission resource, the multiple transmission resources also include at least one unified CRC code. Positions and the quantity of common CRC codes are not limited in the embodiments of the present disclosure. The common CRC code may be located on any of the multiple transmission resources.

As another exemplary embodiment, the data on each transmission resource in the multiple transmission resources may belong to an independent HARQ process.

As another exemplary embodiment, the data on each transmission resource may include at least one of: information about a HARQ process number corresponding to data transmission on each transmission resource; and position information of other transmission resources, except a current transmission resource, in the multiple transmission resources.

A sixth exemplary embodiment provides a terminal device, which may be configured to execute each process executed by the terminal device in the data transmission method in the fifth exemplary embodiment and various implementation modes thereof. The terminal device includes a processing unit and a transmitting unit. The processing unit is configured to independently encode data to be transmitted on each transmission resource in multiple transmission resources. The transmitting unit is configured to transmit the data independently encoded by the processing unit to a network device on each transmission resource without grant.

A seventh exemplary embodiment provides a terminal device, which may be configured to execute each process executed by the terminal device in the data transmission method in the fifth exemplary embodiment and various implementation modes thereof. The terminal device includes a processor and a transmitter. The processor is configured to independently encode data to be transmitted on each transmission resource in multiple transmission resources. The transmitter is configured to transmit the data independently encoded by the processor to a network device on each transmission resource without grant.

An eighth exemplary embodiment provides a system chip, which includes an input interface, an output interface, a processor and a memory. The processor is configured to execute a code stored in the memory, and when the code is executed, the processor may implement each process executed by a terminal device in the data transmission method in the fifth exemplary embodiment and various implementation modes thereof. In the exemplary embodiment, the processor is configured to independently encode data to be transmitted on each transmission resource in multiple transmission resources. The output interface is configured to transmit the data independently encoded by the processor to a network device on each transmission resource without grant.

A ninth exemplary embodiment provides a computer-readable storage medium, which stores a program, the program enabling a network device to execute any data transmission method in the first exemplary embodiment and various implementation modes thereof.

A tenth exemplary embodiment provides a computer-readable storage medium, which stores a program, the program enabling a terminal device to execute any data transmission method in the fifth exemplary embodiment and various implementation modes thereof.

According to the technical solutions of the exemplary embodiments of the present disclosure, the terminal device maps the data to be transmitted onto the multiple transmission resources, independently encodes the data mapped onto each transmission resource and then transmits the data to the network device without grant, so that the network device, after receiving the data on each transmission resource, may independently decode the data on each transmission resource.

In such a manner, when uplink transmission without grant is performed by the terminal device, the network device does not need to determine the position of each transmission resource through a complex receiving mechanism for unified decoding after receiving the data transmitted by the terminal device, and only needs to independently decode the data on each transmission resource after receiving the data on each transmission resource, so that relatively high receiving complexity of the network device is avoided.

BRIEF DESCRIPTION OF THE DRAWINGS

In order to describe the technical solutions of the embodiments of the present disclosure more clearly, the drawings required to be used in the embodiments of the present disclosure will be simply introduced below. It is apparent that the drawings described below are only some embodiments of the present disclosure. Other drawings may further be obtained by those of ordinary skill in the art according to these drawings without creative work.

DETAILED DESCRIPTION OF THE EMBODIMENTS

Figure 1:
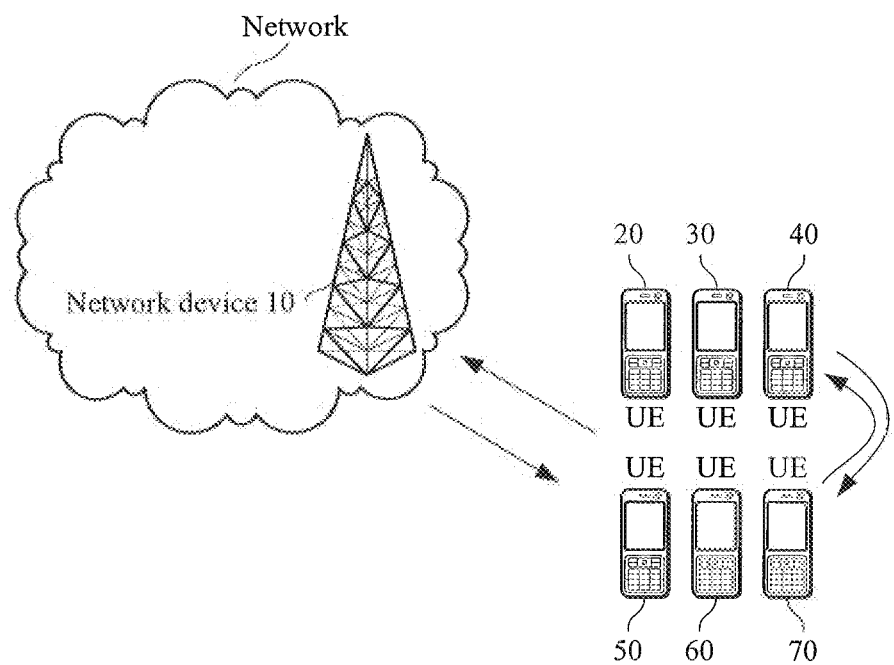
FIG. 1 is a schematic architecture diagram of an application scenario according to an embodiment of the present disclosure.

The technical solutions in the embodiments of the present disclosure will be clearly and completely described below in combination with the drawings in the embodiments of the present disclosure. It is apparent that the described embodiments are not all embodiments but part of embodiments of the present disclosure. All other embodiments obtained by those of ordinary skill in the art on the basis of the embodiments in the present disclosure without creative work shall fall within the scope of protection of the present disclosure.

Terms "part", "module", "system" and the like used in the specification are adopted to represent an entity, hardware, firmware, combination of hardware and software, software or software in execution related to a computer. For example, a part may be, but not limited to, a process running on a processor, the processor, an object, an executable file, an execution thread, a program and/or a computer. It is graphically represented that all applications running on computing equipment and the computing equipment may be parts. One or more parts may reside in a process and/or an execution thread, and the parts may be located on a computer and/or distributed between two or more computers. In addition, these parts may be executed from various computer-readable media on which various data structures are stored. The parts may communicate through local and/or remote processes according to, for example, signals with one or more data groups (for example, data from two parts interacting with each other in a local system, a distributed system and/or a network, for example, the Internet interacting with another system through a signal).

It is to be understood that the technical solutions of the embodiments of the present disclosure may be applied to various communication systems, for example: a Global System of Mobile Communication (GSM), a Code Division Multiple Access (CDMA) system, a Wideband CDMA (WCDMA) system, a Long Term Evolution (LTE) system, an LTE Frequency Division Duplex (FDD) system, LTE Time Division Duplex (TDD), a Universal Mobile Telecommunication System (UMTS) and a future 5G communication system.

Each embodiment is described in the present disclosure in combination with a terminal device. The terminal device may also refer to User Equipment (UE), an access terminal, a user unit, a subscriber station, a mobile radio station, a mobile station, a remote station, a remote terminal, a mobile device, a user terminal, a terminal, a wireless communication device, a user agent or a user device. The access terminal may be a cellular telephone, a cordless telephone, a Session Initiation Protocol (SIP) telephone, a Wireless Local Loop (WLL) station, a Personal Digital Assistant (PDA), a handheld device with a wireless communication function, a computing device, or another processing device connected to a wireless modem, a vehicle-mounted device, a wearable device, a terminal device in a future 5G network, a terminal device in a future evolved Public Land Mobile Network (PLMN) or the like.

Each embodiment is described in the present disclosure in combination with a network device. The network device may be a device configured to communicate with the terminal device, and for example, may be a Base Transceiver Station (BTS) in the GSM or CDMA, may alternatively be a NodeB (NB) in the WCDMA system, and may alternatively be an Evolutional Node B (eNB or eNodeB) in the LTE system. Or the network device may be a relay station, an access point, a vehicle-mounted device, a wearable device, a network-side device in the future 5G network, a network device in the future evolved PLMN or the like.

FIG. 1 is a schematic architecture diagram of a communication system to which the embodiments of the present disclosure may be applied. As shown in FIG. 1, the communication system may include a network device 10 and terminal devices 20 to 70 (represented by "UE" for short in FIG. 1) which are wirelessly connected or connected in a wired manner or connected in another manner.

A network in the embodiments of the present disclosure may refer to a PLMN or a Device to Device (D2D) network or a Machine to Machine/Man (M2M) network or another network. FIG. 1 is only an exemplary simplified schematic diagram. The network may further include other network devices which are not presented in FIG. 1.

The solutions provided in the application may be applied to grant free transmission, i.e., transmission without grant. Grant free transmission may be applied to various services in a future network, for example, a Machine Type Communication (MTC) service or an Ultra Reliable and Low Latency Communication (URLLC) service, to meet service transmission requirements of low delay and high reliability.

Grant free transmission may refer to data transmission of the terminal device on a licensed carrier and may also refer to data transmission of the terminal device on an unlicensed carrier. The terminal device having data required to be transmitted may autonomously transmit the data without waiting for a resource grant of the network device. The transmission without grant may be embodied as transmission for uplink data.

In the solutions provided in the embodiments of the present disclosure, when the terminal device autonomously transmits the data on multiple transmission resources, the network device independently decodes the data on the multiple transmission resources based on a predetermined resource granularity. In this way, when the network device does not know about physical resource information (for example, the total quantity and positions of adopted physical resource units) adopted for data transmission performed by the terminal device, the network device may still decode the data transmitted by the terminal device, so that receiving complexity is reduced (for example, the network device does not need to adopt a blind detection manner to detect a physical resource adopted for data transmission of the terminal device).

Figure 2:
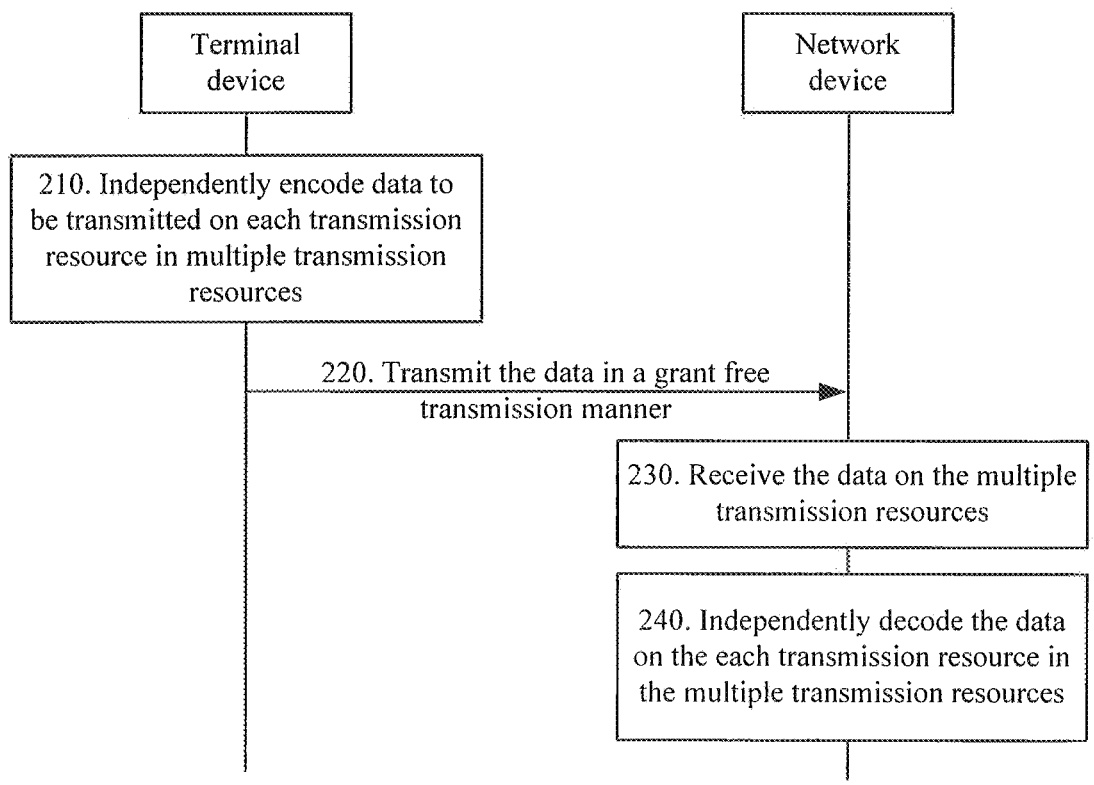
FIG. 2 is an interaction flowchart of a data transmission method according to an embodiment of the present disclosure.

FIG. 2 is an interaction flowchart of a data transmission method according to an embodiment of the present disclosure. In the method shown in FIG. 2, a transmitter of data may be a terminal device or a network device, and a receiver of the data may be a terminal device or a network device. Descriptions will be made below with the situation that the transmitter of the data is a terminal device and the receiver of the data is a network device as an example. However, the embodiment of the present disclosure is not limited thereto.

A network device and a terminal device are shown in FIG. 2. The network device may be, for example, the network device 10 shown in FIG. 1 and the terminal device may be, for example, any one of UEs 20 to 70 shown in FIG. 1. Uplink transmission without grant may be performed between the terminal device and network device in FIG. 2. The terminal device may perform data transmission with multiple network devices including the network device by use of the method of the embodiment of the present disclosure. A method executed by the other network devices may refer to a method executed by the network device and, for simplicity, will not be elaborated herein. In the exemplary embodiments of the present disclosure, the method may be applied to uplink transmission without grant and may alternatively be applied to another scenario. Descriptions will be made herein with uplink transmission without grant as an example. That is, uplink transmission between the terminal device and the network device is uplink transmission without grant. An adopted transmission resource is an uplink transmission resource without grant. The data transmission method of the embodiment of the present disclosure will be described below according to FIG. 2.

In act 210, the terminal device independently encodes data to be transmitted on each transmission resource in multiple transmission resources.

Each transmission resource may be called an independent decoding data region. The terminal device may map the data to be transmitted onto the multiple transmission resources and independently encode the data to be transmitted on each transmission resource in the multiple transmission resources to enable the network device to, after receiving the data which is transmitted by the terminal device on the multiple transmission resources, independently decode the data received on each transmission resource in the multiple transmission resources. Alternatively, the terminal device, when being required to transmit a Physical Uplink Shared Channel (PUSCH), may transmit the PUSCH on the multiple transmission resources and independently encode the data on each transmission resource in the multiple transmission resources. Furthermore, the terminal device may also perform independent interleaving processing on the data to be transmitted on each transmission resource in the multiple transmission resources. The data may include service data or signaling data.

It can be understood that, in the embodiment, the terminal device may also transmit the data on only one transmission resource. If the data to be transmitted by the terminal device is required to occupy only one transmission resource and no more transmission resources are required, the terminal device may only encode the data on the transmission resource and transmit the data to the network device without grant. The network device, after receiving the data on the transmission resource, may only decode the data on the transmission resource.

In the exemplary embodiments of the present disclosure, each transmission resource in the multiple transmission resources includes at least one resource unit.

In the exemplary embodiment, when each transmission resource includes one resource unit, system flexibility is relatively high. Taking into consideration a specific network condition or a data transmission condition during a practical application, each transmission resource may alternatively include multiple resource units.

Figure 3A:
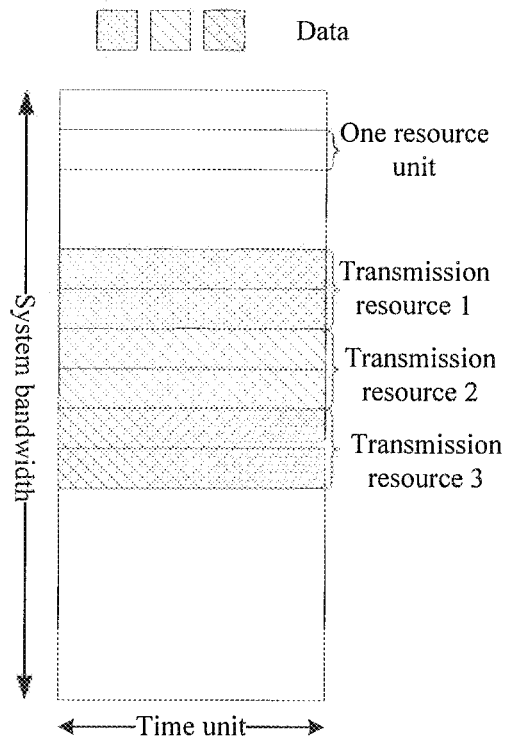
FIG. 3(a) is a schematic diagram of transmission resources according to an embodiment of the present disclosure.

For example, FIG. 3(a) is a schematic diagram of transmission resources according to an embodiment of the present disclosure. The terminal device may determine the multiple transmission resources for the data to be transmitted, e.g., a transmission resource 1, a transmission resource 2 and a transmission resource 3 for transmitting the present data. The three transmission resources may be, for example, transmission resources on the same time unit and occupy different frequency-domain resources. Each transmission resource includes N resource units. There is made such a hypothesis herein that N=2, that is, each transmission resource includes two resource units.

When each transmission resource includes multiple resource units, a starting position of the resource units in each transmission resource may be predetermined.

For example, it may be predetermined that an index number P of a starting resource unit in each transmission resource meets P mod N=k, N being a quantity of resource units in each transmission resource and k being a preset non-negative integer smaller than N. If each transmission resource includes two resource units, that is, N=2, k is 0 or 1. If it is predetermined that k=0, it represents that the index number P of the starting resource unit in each transmission resource is an even number. If it is predetermined that k=1, it represents that the index number P of the starting resource unit in each transmission resource is an odd number. A value of k may be pre-agreed by the terminal device and the network device, for example, specified by a protocol, and may alternatively be configured and notified to the terminal device by the network device.

In the exemplary embodiments of the present disclosure, the at least one resource unit is continuous or discontinuous in a frequency domain.

Figure 3B:
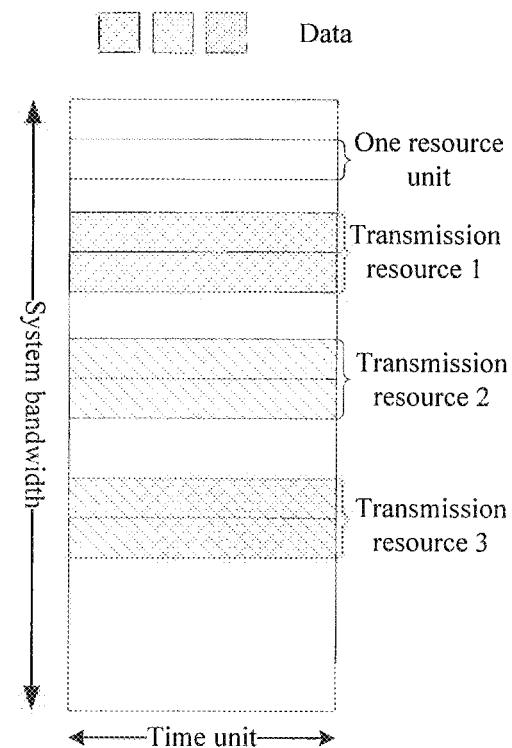
FIG. 3(b) is a schematic diagram of transmission resources according to an embodiment of the present disclosure.

Under the situation shown in FIG. 3(a), each transmission resource is continuously distributed in a frequency domain. But in fact, the multiple transmission resources configured to transmit the data may alternatively be discontinuous in a frequency domain. For example, FIG. 3(b) is a schematic diagram of transmission resources according to an embodiment of the present disclosure. There is a certain interval between each transmission resource in the multiple transmission resources in the frequency domain. The transmission resource 1, the transmission resource 2 and the transmission resource 3 are discontinuous in the frequency domain.

When each transmission resource is discontinuous in the frequency domain, the terminal device may autonomously determine a position of each transmission resource or the terminal device may determine the position of each transmission resource according to a preset rule.

For example, the terminal device may determine the positions of the multiple transmission resources according to an ID of the terminal device.

For example, also as shown in FIG. 3(b), the terminal device may autonomously select the position of a first transmission resource first and determine the positions of the other transmission resources according to the position of the first transmission resource, the ID of the terminal device and a predetermined algorithm or formula.

In the exemplary embodiments of the present disclosure, the at least one resource unit in each transmission resource is continuous or discontinuous in a frequency domain.

In the above situations shown in FIG. 3(a) and FIG. 3(b), the N resource units in each transmission resource are continuous in the frequency domain, that is, the N resource units in each transmission resource are continuously distributed. The situation that N physical resource blocks of a transmission resource are discontinuous in the frequency domain will be described below in combination with FIG.

3(c). As shown in FIG. 3(b), if N=2, the resource units in each transmission resource are discontinuously distributed, two resource units of the transmission resource 1 are spaced by three resource units, two resource units of the transmission resource 2 are spaced by three resource units and two resource units of the transmission resource 2 are spaced by three resources.

When the resource units in each transmission resource are discontinuous in the frequency domain, the terminal device may determine the position of each resource unit according to the preset rule. For example, the terminal device may determine a position of the resource unit in each transmission resource according to the ID of the terminal device and a predetermined algorithm or formula.

In act 220, the terminal device transmits the data to a network device on the multiple transmission resources without grant.

It can be understood that the data transmitted by the terminal device in the multiple transmission resources without grant may be data born in the same PUSCH. That is, the terminal device may transmit the PUSCH on the multiple transmission resources.

In act 230, the network device receives the data which is transmitted by the terminal device on the multiple transmission resources without grant.

In the exemplary embodiments of the present disclosure, before the operation that the network device receives the data which is transmitted by the terminal device on the multiple transmission resources without grant, the method may further include that: the network device determines positions of the multiple transmission resources according to an ID of the terminal device.

For example, according to the position of one transmission resource in the multiple transmission resources, the ID of the terminal device and the predetermined algorithm or formula, the network device may determine positions of the other transmission resources.

In the exemplary embodiments of the present disclosure, before the operation that the network device receives the data which is transmitted by the terminal device on the multiple transmission resources without grant, the method may further include that: the network device determines a position of at least one resource unit in each transmission resource according to an ID of the terminal device.

For example, the network device may determine the position of the resource unit in each transmission resource according to the ID of the terminal device and the predetermined algorithm or formula.

In act 240, the network device independently decodes the data on each transmission resource in the multiple transmission resources.

Since the terminal device transmits the data to be transmitted on the multiple transmission resources without grant and independently encodes the data on each transmission resource, the network device, after receiving the data which is transmitted by the terminal device on each transmission resource in the multiple transmission resources, may independently decode the data on each transmission resource without being influenced by data transmission on the other transmission resources. Encoding/decoding and transmission processes for the data on each transmission resource may be mutually independent.

Figure 3C:
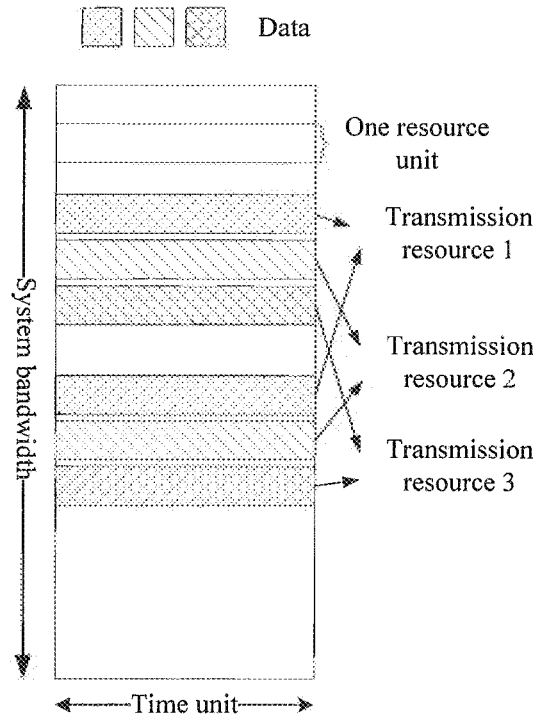
FIG. 3(c) is a schematic diagram of transmission resources according to an embodiment of the present disclosure.

For example, as shown in FIG. 3(a), FIG. 3(b) and FIG. 3(c), the network device, when receiving the data on the transmission resource 1, may independently decode the data on the transmission resource 1; the network device, when receiving the data on the transmission resource 2, may independently decode the data on the transmission resource 2; and the network device, when receiving the data on the transmission resource 3, may independently decode the data on the transmission resource 3. Therefore, the network device does not need to acquire, through a complex receiving mechanism, specific positions of the transmission resource 1, the transmission resource 2 and the transmission resource 3 adopted for data transmission of the terminal device in order to decode the data transmitted by the terminal device in a unified manner after receiving the data on the three transmission resources.

Therefore, when the terminal device autonomously transmits the data on the multiple transmission resources without grant, the network device may receive and independently decode the data on each transmission resource in the multiple transmission resources based on a predetermined transmission resource granularity, and does not need to perform unified decoding after completing reception of the data on the multiple transmission resources through the complex receiving mechanism.

Figure 4:
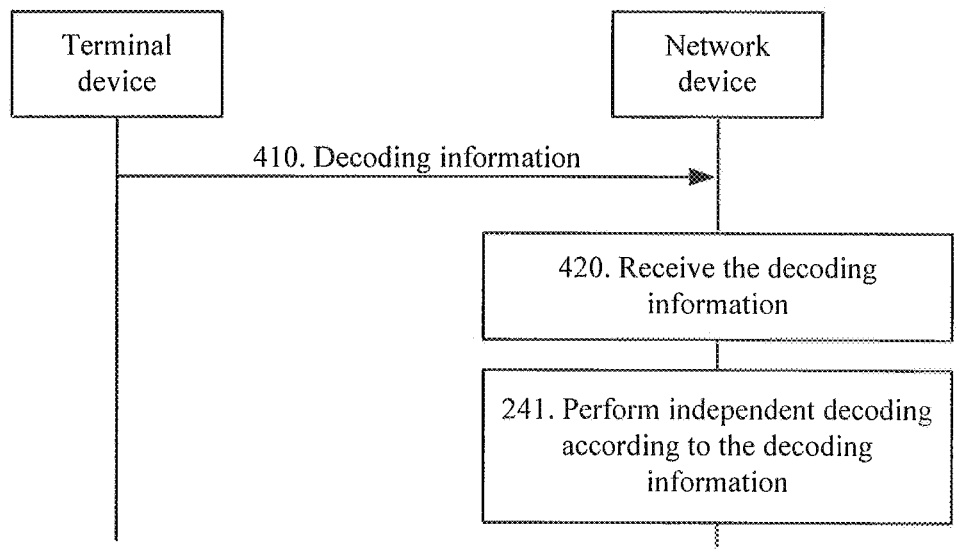
FIG. 4 is an interaction flowchart of a data transmission method according to another embodiment of the present disclosure.

In the exemplary embodiments of the present disclosure, FIG. 4 is an interaction flowchart of a data transmission method according to an embodiment of the present disclosure. The method may further include operations shown in acts 410 and 420. In such case, the act 240 may include act 241.

In act 410, the terminal device transmits, on a specific time-frequency resource in each transmission resource, decoding information used for decoding the data on each transmission resource to the network device.

In act 420, the network device receives, on the specific time-frequency resource in each transmission resource, the decoding information used for decoding the data on each transmission resource.

In act 241, the network device independently decodes the data on each transmission resource according to the decoding information used for decoding the data on each transmission resource.

In the exemplary embodiment, when the terminal device transmits the data to the network device on the multiple transmission resources without grant in act 220, the decoding information used for decoding the data on each transmission resource may also be transmitted to the network device on the specific time-frequency resource in each transmission resource.

That is, the terminal device may determine a specific time-frequency resource in each transmission resource and, when performing uplink transmission without grant, the terminal device may simultaneously transmit the related decoding information required by decoding of the data in this region at a position of the specific time-frequency resource. The decoding information on each transmission resource may be, for example, at least one of: an MCS corresponding to each transmission resource, precoding information corresponding to each transmission resource, reference signal information corresponding to each transmission resource, and a size of each transmission resource.

The network device, when receiving the data which is transmitted by the terminal device on the multiple transmission resources without grant, may receive on the specific time-frequency resource in each transmission resource the decoding information used for decoding the data on each transmission resource. After receiving the decoding information, the network device may independently decode the data on each transmission resource according to the decoding information corresponding to the transmission resource.

In the embodiment of the present disclosure, the terminal device maps the data to be transmitted onto the multiple transmission resources, independently encodes the data mapped onto each transmission resource and then transmits the data to the network device without grant, so that the network device, after receiving the data on each transmission resource, may independently decode the data on each transmission resource. In such a manner, when uplink transmission without grant is performed by the terminal device, the network device does not need to determine the position of each transmission resource through the complex receiving mechanism for unified decoding after receiving the data transmitted by the terminal device on each transmission resource, and only needs to independently decode the data on each transmission resource after receiving the data on each transmission resource.

It is to be understood that, in the embodiment of the present disclosure, the terminal device maps the data to be transmitted onto the multiple transmission resources and may independently encode the data mapped onto each transmission resource. Furthermore, the terminal device may also perform independent interleaving processing on the data mapped onto each transmission resource.

For the data on each transmission resource in the multiple transmission manners, two manners may be adopted for a corresponding HARQ process and will be described below respectively.

A First Manner

The data on the multiple transmission resources belong to a same HARQ process.

For example, as shown in FIG. 3(a), FIG. 3(b) and FIG. 3(c), all the data transmitted by the terminal device in one time unit on the transmission resource 1, the transmission resource 2 and the transmission resource 3 may correspond to the same HARQ process. For example, the network device may transmit a feedback for the data to the terminal device through the same HARQ process.

Such a manner is relatively easy to implement. However, if the data on a transmission resource, for example, the transmission resource 1, fails to be decoded, the data transmitted on all the transmission resources in the time unit, i.e., the transmission resource 1, the transmission resource 2 and the transmission resource 3, without grant is suggested to be retransmitted.

In the exemplary embodiments of the present disclosure, the data on each transmission resource includes at least one of: a total quantity of the multiple transmission resources, index numbers of other transmission resources, except a current transmission resource, in the multiple transmission resources, and position information of the other transmission resources.

In the exemplary embodiments of the present disclosure, the data on the multiple transmission resources includes at least one common CRC code.

That is, the terminal device maps the data to be transmitted in the uplink transmission manner without grant onto the multiple transmission resources. In addition to a CRC code specific for and carried in the data on each transmission resource, the multiple transmission resources also include at least one unified CRC code.

Figure 5:
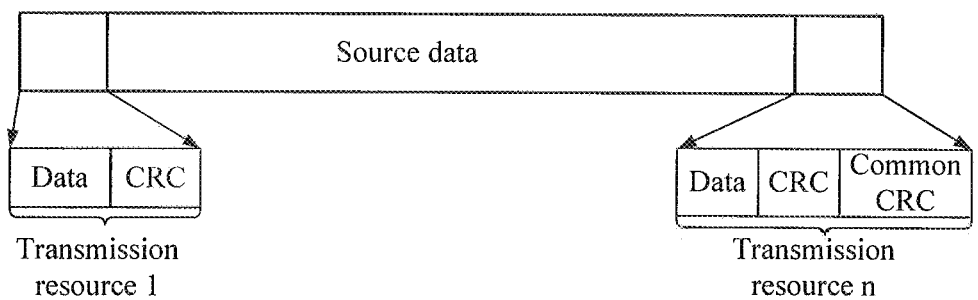
FIG. 5 is a schematic diagram of a CRC code according to an embodiment of the present disclosure.

FIG. 5 is a schematic diagram of a CRC code according to an embodiment of the present disclosure. There is made such a hypothesis that the terminal device determines n transmission resources for the data to be transmitted. In the whole source data, the source data may include data on transmission resources 1 to n, the data on the transmission resources 1 to n includes their respective CRC codes and, meanwhile, the last transmission resource, i.e., the transmission resource n, also includes a common CRC code which is configured to check the data on the transmission resources 1 to n. Positions and quantity of common CRC codes are not limited in the embodiment of the present disclosure. The common CRC code may be located on any of the multiple transmission resources.

A Second Manner

The data on each transmission resource in the multiple transmission resources belongs to an independent HARQ process.

For example, as shown in FIG. 3(a), FIG. 3(b) and FIG. 3(c), the data transmitted by the terminal device in one time unit on the transmission resource 1, the transmission resource 2 and the transmission resource 3 corresponds to independent HARQ processes respectively. For example, the transmission resource 1 corresponds to a HARQ process 1, the transmission resource 2 corresponds to a HARQ process 2 and the transmission resource 3 corresponds to a HARQ process 3. The network device gives a feedback for the data on the transmission resource 1 through the HARQ process 1, the network device gives a feedback for the data on the transmission resource 2 through the HARQ process 2 and the network device gives a feedback for the data on the transmission resource 3 through the HARQ process 3.

In the exemplary embodiments of the present disclosure, the data on each transmission resource in the multiple transmission resources includes at least one of: information about a HARQ process number corresponding to data transmission on each transmission resource; and position information, for example, frequency-domain position information of other transmission resources, except a current transmission resource, in the multiple transmission resources.

In such a manner, the system complexity is increased. However, if the data on a transmission resource, for example, the transmission resource 1, fails to be decoded while the data on the other transmission resources, for example, the transmission resource 2 and the transmission resource 3, are successfully decoded, the terminal device may only retransmit the data on the transmission resource 1.

It is to be understood that, in various embodiments of the present disclosure, an order of a sequence number of each process does not mean an execution sequence and the execution sequence of each process should be determined by its function and an internal logic, and the sequence number used should not form any limit to an implementation process of the embodiments of the present disclosure.

The data transmission method according to the embodiments of the present disclosure is described above in detail. A network device and terminal device according to the embodiments of the present disclosure will be described below. It is to be understood that the network device and terminal device of the embodiments of the present disclosure may execute various methods in the abovementioned embodiments of the present disclosure. That is, the following specific working process of each device may refer to the corresponding process in the method embodiments.

Figure 6:
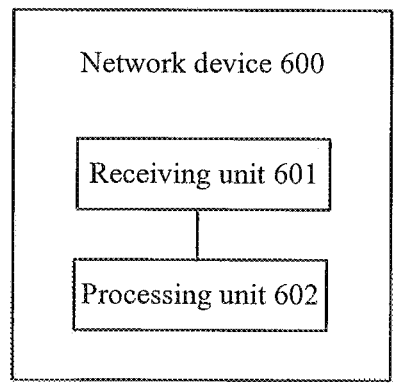
FIG. 6 is a structure block diagram of a network device according to an embodiment of the present disclosure.

FIG. 6 is a schematic block diagram of a network device 600 according to an embodiment of the present disclosure. As shown in FIG. 6, the network device 600 includes a receiving unit 601 and a processing unit 602.

The receiving unit 601 is configured to receive data which is transmitted by a terminal device on multiple transmission resources without grant.

The processing unit 602 is configured to independently decode the data, received by the receiving unit 601, on each transmission resource in the multiple transmission resources.

The network device independently decodes the data received on each transmission resource in the multiple transmission resources, so that when uplink transmission without grant is performed by a terminal device, the network device does not need to acquire a position of each transmission resource through a complex receiving mechanism for unified decoding after receiving the data which is transmitted by the terminal device on each transmission resource.

In the exemplary embodiments of the present disclosure, each transmission resource includes at least one resource unit.

In the exemplary embodiments of the present disclosure, an index number P of a starting resource unit in each transmission resource meets P mod N=k, N being a quantity of resource units in each transmission resource and k being a preset non-negative integer smaller than N.

In the exemplary embodiments of the present disclosure, the at least one resource unit is continuous or discontinuous in a frequency domain.

In the exemplary embodiments of the present disclosure, the multiple transmission resources are continuous or discontinuous in a frequency domain.

In the exemplary embodiments of the present disclosure, the network device further includes a determination unit, configured to determine, before the receiving unit receives the data which is transmitted by the terminal device on the multiple transmission resources without grant, positions of the multiple transmission resources according to an ID of the terminal device.

In the exemplary embodiments of the present disclosure, the network device further includes the determination unit, configured to determine, before the receiving unit receives the data which is transmitted by the terminal device on the multiple transmission resources without grant, a position of the at least one resource unit in each transmission resource according to an ID of the terminal device.

In the exemplary embodiments of the present disclosure, the receiving unit is further configured to receive, on a specific time-frequency resource in each transmission resource, decoding information used for decoding the data on each transmission resource, before the processing unit 601 independently decodes the data on each transmission resource in the multiple transmission resources.

The processing unit 601 is configured to independently decode the data on each transmission resource according to the decoding information used for decoding the data on each transmission resource.

In the exemplary embodiments of the present disclosure, the decoding information includes at least one of: an MCS corresponding to each transmission resource, precoding information corresponding to each transmission resource, reference signal information corresponding to each transmission resource, and a size of each transmission resource.

In the exemplary embodiments of the present disclosure, the data on the multiple transmission resources belongs to a same HARQ process.

In the exemplary embodiments of the present disclosure, the data on each transmission resource includes at least one of: a total quantity of the multiple transmission resources, index numbers of other transmission resources, except a current transmission resource, in the multiple transmission resources, and position information of the other transmission resources.

In the exemplary embodiments of the present disclosure, the data on the multiple transmission resources includes at least one common CRC code.

In the exemplary embodiments of the present disclosure, the data on each transmission resource in the multiple transmission resources belongs to an independent HARQ process.

In the exemplary embodiments of the present disclosure, the data on each transmission resource includes at least one of: information about a HARQ process number corresponding to data transmission on each transmission resource; and position information of other transmission resources, except a current transmission resource, in the multiple transmission resources.

Figure 7:
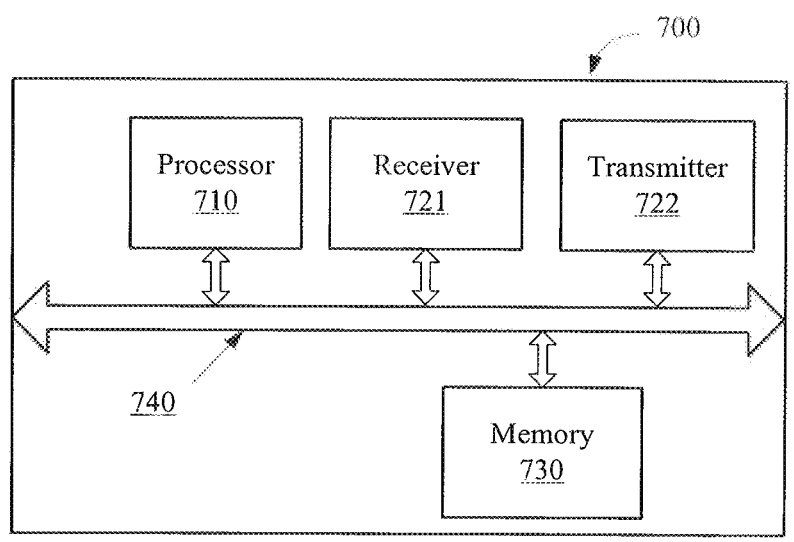
FIG. 7 is a structure block diagram of a network device according to an embodiment of the present disclosure.

It is to be noted that, in the embodiment of the present disclosure, the processing unit 602 may be implemented by a processor and the receiving unit 601 may be implemented by a receiver. As shown in FIG. 7, a network device 700 may include a processor 710, a transceiver 720 and a memory 730. The transceiver 720 may include a receiver 721 and a transmitter 722. The memory 730 may be configured to store decoding information, a code to be executed by the processor 710 and the like. Different components in the network device 700 are coupled with each other through a bus system 740. The bus system 740 includes a data bus, and further includes a power bus, a control bus, a state signal bus and the like.

The receiver 721 is configured to receive data which is transmitted by a terminal device on multiple transmission resources without grant.

The processor 710 is configured to independently decode the data, received by the receiver 721, on each transmission resource in the multiple transmission resources.

The network device independently decodes the data received on each transmission resource, so that when uplink transmission without grant is performed by a terminal device, the network device does not need to acquire a position of each transmission resource for unified decoding after receiving the data which is transmitted by the terminal device on each transmission resource, thereby reducing the receiving complexity at the network device.

In the exemplary embodiments of the present disclosure, each transmission resource includes at least one resource unit.

In the exemplary embodiments of the present disclosure, an index number P of a starting resource unit in each transmission resource meets P mod N=k, N being a quantity of resource units in each transmission resource and k being a preset non-negative integer smaller than N.

In the exemplary embodiments of the present disclosure, the at least one resource unit is continuous or discontinuous in a frequency domain.

In the exemplary embodiments of the present disclosure, the multiple transmission resources are continuous or discontinuous in a frequency domain.

In the exemplary embodiments of the present disclosure, the network device further includes a determination unit, configured to determine, before the receiver 721 receives the data which is transmitted by the terminal device on the multiple transmission resources without grant, positions of the multiple transmission resources according to an ID of the terminal device.

In the exemplary embodiments of the present disclosure, the network device further includes the determination unit, configured to determine, before the receiver 721 receives the data which is transmitted by the terminal device on the multiple transmission resources without grant, a position of at least one resource unit in each transmission resource according to an ID of the terminal device.

In the exemplary embodiments of the present disclosure, the receiver 721 is further configured to receive, on a specific time-frequency resource in each transmission resource, decoding information used for decoding the data on each transmission resource, before the processor 710 independently decodes the data on each transmission resource in the multiple transmission resources.

The processor 710 is configured to independently decode the data on each transmission resource according to the decoding information used for decoding the data on each transmission resource.

In the exemplary embodiments of the present disclosure, the decoding information includes at least one of: an MCS corresponding to each transmission resource, precoding information corresponding to each transmission resource, reference signal information corresponding to each transmission resource, and a size of each transmission resource.

In the exemplary embodiments of the present disclosure, the data on the multiple transmission resources belongs to a same HARQ process.

In the exemplary embodiments of the present disclosure, the data on each transmission resource includes at least one of: a total quantity of the multiple transmission resources, index numbers of other transmission resources, except a current transmission resource, in the multiple transmission resources, and position information of the other transmission resources.

In the exemplary embodiments of the present disclosure, the data on the multiple transmission resources includes at least one common CRC code.

In the exemplary embodiments of the present disclosure, the data on each transmission resource in the multiple transmission resources belongs to an independent HARQ process.

In the exemplary embodiments of the present disclosure, the data on each transmission resource includes at least one of: information about a HARQ process number corresponding to data transmission on each transmission resource; and position information of other transmission resources, except a current transmission resource, in the multiple transmission resources.

Figure 8:
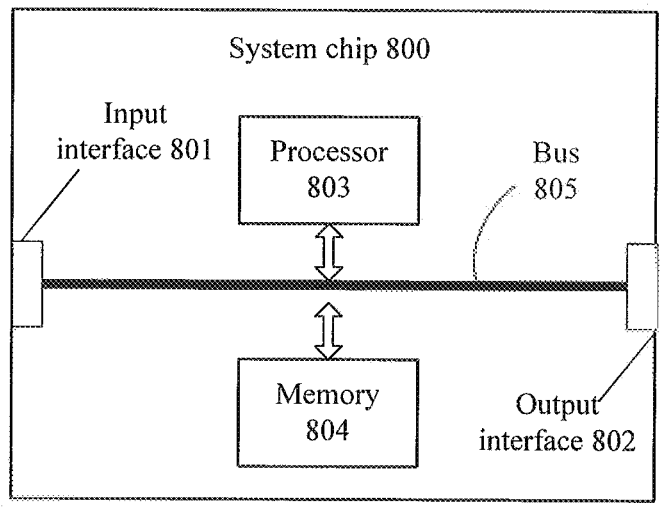
FIG. 8 is a schematic structure diagram of a system chip according to an embodiment of the present disclosure.

FIG. 8 is a schematic structure diagram of a system chip according to an embodiment of the present disclosure. The system chip 800 of FIG. 8 includes an input interface 801, output interface 802, processor 803 and memory 804 which are connected through a bus 805. The processor 803 is configured to execute a code stored in the memory 804. When the code is executed, the processor 803 implements the method executed by the network device in FIG. 2 to FIG. 5.

The network device 600 shown in FIG. 6 or the network device 700 shown in FIG. 7 or the system chip 800 shown in FIG. 8 may implement each process implemented by the network device in the method embodiment of FIG. 2 to FIG. 5. No more elaborations will be made herein to avoid repetitions.

Figure 9:
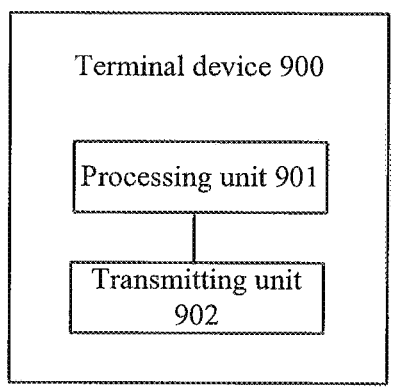
FIG. 9 is a structure block diagram of a terminal device according to an embodiment of the present disclosure.

FIG. 9 is a schematic block diagram of a network device 900 according to an embodiment of the present disclosure. As shown in FIG. 9, the network device 900 includes a processing unit 901 and a transmitting unit 902.

The processing unit 901 is configured to independently encode data to be transmitted on each transmission resource in multiple transmission resources.

The transmitting unit 902 is configured to transmit the data independently encoded by the processing unit 901 to a network device on each transmission resource without grant.

The terminal device maps the data to be transmitted onto the multiple transmission resources, independently encodes the data mapped onto each transmission resource and then transmits the data to the network device without grant, so that the network device, after receiving the data on each transmission resource, may independently decode the data on each transmission resource, thereby reducing the receiving complexity at the network device.

In the exemplary embodiments of the present disclosure, each transmission resource includes at least one resource unit.

In the exemplary embodiments of the present disclosure, an index number P of a starting resource unit in each transmission resource meets P mod N=k, N being a quantity of resource units in each transmission resource and k being a preset non-negative integer smaller than N.

In the exemplary embodiments of the present disclosure, the at least one resource unit is continuous or discontinuous in a frequency domain.

In the exemplary embodiments of the present disclosure, the multiple transmission resources are continuous or discontinuous in a frequency domain.

In the exemplary embodiments of the present disclosure, the terminal device further includes a determination module 903, configured to determine, before the processing unit 901 independently encodes the data to be transmitted on each transmission resource in the multiple transmission resources, positions of the multiple transmission resources according to an ID of the terminal device.

In the exemplary embodiments of the present disclosure, the terminal device further includes the determination module 903, configured to determine, before the processing unit 901 independently encodes the data to be transmitted on each transmission resource in the multiple transmission resources, a position of at least one resource unit in each transmission resource according to an ID of the terminal device.

In the exemplary embodiments of the present disclosure, the transmitting unit 902 is further configured to transmit, on a specific time-frequency resource in each transmission resource, decoding information used for decoding the data on each transmission resource to the network device.

In the exemplary embodiments of the present disclosure, the decoding information includes at least one of: an MCS corresponding to each transmission resource, precoding information corresponding to each transmission resource, reference signal information corresponding to each transmission resource, and a size of each transmission resource.

In the exemplary embodiments of the present disclosure, the data on the multiple transmission resources belongs to a same HARQ process.

In the exemplary embodiments of the present disclosure, the data on each transmission resource includes at least one of: a total quantity of the multiple transmission resources, index numbers of other transmission resources, except a current transmission resource, in the multiple transmission resources, and position Information of the other transmission resources.

In the exemplary embodiments of the present disclosure, the data on the multiple transmission resources includes at least one common CRC code.

In the exemplary embodiments of the present disclosure, the data on each transmission resource in the multiple transmission resources belongs to an independent HARQ process.

In the exemplary embodiments of the present disclosure, the data on each transmission resource includes at least one of: information about a HARQ process number corresponding to data transmission on each transmission resource; and position information of other transmission resources, except a current transmission resource, in the multiple transmission resources.

Figure 10:
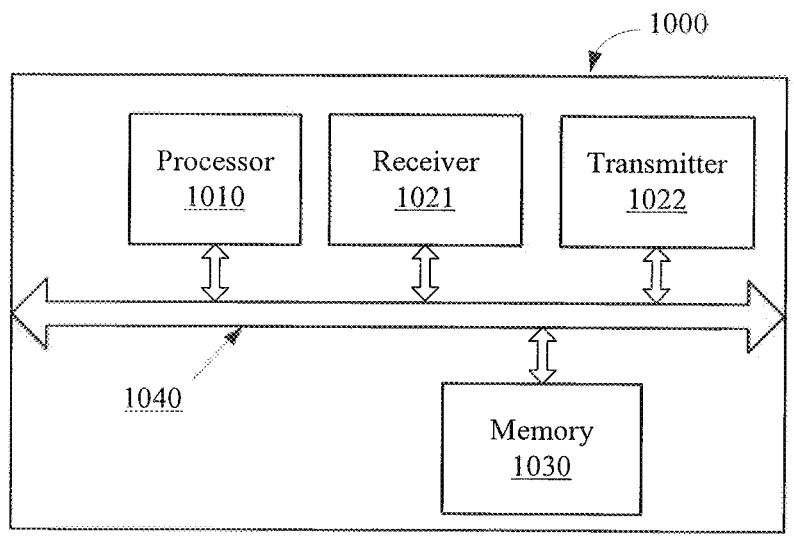
FIG. 10 is a structure block diagram of a terminal device according to an embodiment of the present disclosure.

It is to be noted that, in the embodiment of the present disclosure, the processing unit 901 and the determination module 903 may be implemented by a processor and the transmitting unit 902 may be implemented by a transmitter. As shown in FIG. 10, the terminal device 1000 may include a processor 1010, a transceiver 1020 and a memory 1030. The transceiver 1020 may include a receiver 1021 and a transmitter 1022. The memory 1030 may be configured to store decoding information, a code to be executed by the processor 1010 and the like. Each component in the terminal device 1000 is coupled together through a bus system 1040. The bus system 1040 includes a data bus, and further includes a power bus, a control bus, a state signal bus and the like.

The processor 1010 is configured to independently encode data to be transmitted on each transmission resource in multiple transmission resources.

The transmitter 1022 is configured to transmit the data independently encoded by the processor 1010 to a network device on each transmission resource without grant.

The terminal device maps the data to be transmitted onto the multiple transmission resources, independently encodes the data mapped onto each transmission resource and then transmits the data to the network device without grant, so that the network device, after receiving the data on each transmission resource, may independently decode the data on each transmission resource, thereby reducing the receiving complexity at the network device.

In the exemplary embodiments of the present disclosure, each transmission resource includes at least one resource unit.

In the exemplary embodiments of the present disclosure, an index number P of a starting resource unit in each transmission resource meets P mod N=k, N being a quantity of resource units in each transmission resource and k being a preset non-negative integer smaller than N.

In the exemplary embodiments of the present disclosure, the at least one resource unit is continuous or discontinuous in a frequency domain.

In the exemplary embodiments of the present disclosure, the multiple transmission resources are continuous or discontinuous in a frequency domain.

In the exemplary embodiments of the present disclosure, the processor 1010 is further configured to determine, before the processor 1010 independently encodes the data to be transmitted on each transmission resource in the multiple transmission resources, positions of the multiple transmission resources according to an ID of the terminal device.

In the exemplary embodiments of the present disclosure, the processor 1010 is further configured to determine, before the processor 1010 independently encodes the data to be transmitted on each transmission resource in the multiple transmission resources, a position of at least one resource unit in each transmission resource according to an ID of the terminal device.

In the exemplary embodiments of the present disclosure, the transmitter 1022 is further configured to transmit, on a specific time-frequency resource in each transmission resource, decoding information used for decoding the data on each transmission resource to the network device.

In the exemplary embodiments of the present disclosure, the decoding information includes at least one of: an MCS corresponding to each transmission resource, precoding information corresponding to each transmission resource, reference signal information corresponding to each transmission resource, and a size of each transmission resource.

In the exemplary embodiments of the present disclosure, the data on the multiple transmission resources belongs to a same HARQ process.

In the exemplary embodiments of the present disclosure, the data on each transmission resource includes at least one of: a total quantity of the multiple transmission resources, index numbers of other transmission resources, except a current transmission resource, in the multiple transmission resources, and position information of the other transmission resources.

In the exemplary embodiments of the present disclosure, the data on the multiple transmission resources includes at least one common CRC code.

In the exemplary embodiments of the present disclosure, the data on each transmission resource in the multiple transmission resources belongs to an independent HARQ process.

In the exemplary embodiments of the present disclosure, the data on each transmission resource includes at least one of: information about a HARQ process number corresponding to data transmission on each transmission resource; and position information of other transmission resources, except a current transmission resource, in the multiple transmission resources.

Figure 11:
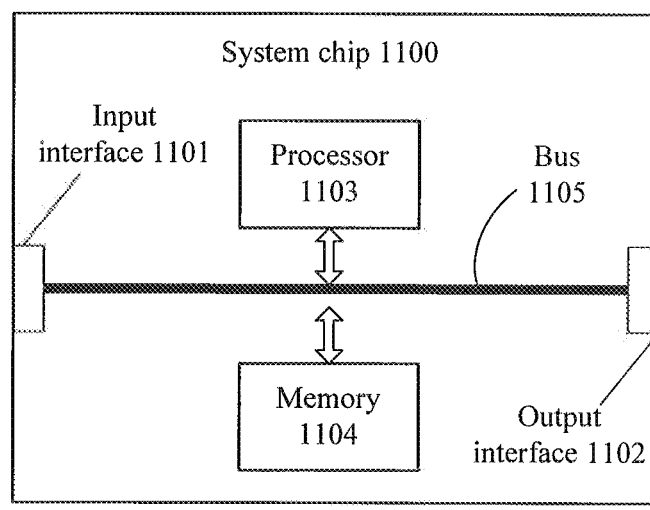
FIG. 11 is a schematic structure diagram of a system chip according to an embodiment of the present disclosure.

FIG. 11 is a schematic structure diagram of a system chip according to an embodiment of the present disclosure. The system chip 1100 of FIG. 11 includes an input interface 1101, output interface 1102, processor 1103 and memory 1104 which are connected through a bus 1105. The processor 1103 is configured to execute a code stored in the memory 1104. When the code is executed, the processor 1103 implements the method executed by the terminal device in FIG. 2 to FIG. 5.

The terminal device 900 shown in FIG. 9 or the terminal device 1000 shown in FIG. 10 or the system chip 1100 shown in FIG. 11 may implement each process implemented by the terminal device in the method embodiment of FIG. 2 to FIG. 5. No more elaborations will be made herein to avoid repetitions.

It is to be understood that term "and/or" in the present disclosure is only an association relationship describing associated objects and represents that three relationships may exist. For example, A and/or B may represent three situations: i.e., independent existence of A, existence of both A and B and independent existence of B. In addition, character "/" in the present disclosure usually represents that previous and next associated objects form an "or" relationship.

It is to be understood that, in various embodiments of the present disclosure, a magnitude of a sequence number of each process does not mean an execution sequence and the execution sequence of each process should be determined by its function and an internal logic and should not form any limit to an implementation process of the embodiments of the present disclosure.

Those of ordinary skill in the art may realize that the units and algorithm acts of each example described in combination with the embodiments provided in the present disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the present disclosure.

Those skilled in the art should clearly know that specific working processes of the system, device and unit described above may refer to the corresponding processes in the method embodiment and will not be elaborated herein for convenient and brief description.

In some embodiments provided by the application, it is to be understood that the provided system, device and method may be implemented in another manner. For example, the device embodiment described above is only schematic. For example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may alternatively be distributed to multiple network units. Part or all of the units may be selected to achieve the purpose of the solutions of the embodiments according to a practical requirement.

In addition, each functional unit in each embodiment of the present disclosure may be integrated into a processing unit, each unit may also physically exist independently, and two or more than two units may alternatively be integrated into a unit.

When being realized in form of software functional unit and sold or used as an independent product, the function may be stored in a computer-readable storage medium. Based on such an understanding, the technical solutions of the present disclosure substantially or parts making contributions to a conventional art or part of the technical solutions may be embodied in form of software product, and the computer software product is stored in a storage medium, including a plurality of instructions configured to enable a computer device (which may be a personal computer, a server, a network device or the like) to execute all or part of the operations in the acts of the method in each embodiment of the present disclosure. The storage medium includes: various media capable of storing program codes such as a U disk, a mobile hard disk, a Read-Only Memory (ROM), a Random Access Memory (RAM), a magnetic disk or an optical disk.

The above is only the specific implementation mode of the present disclosure and not intended to limit the scope of protection of the present disclosure. Any variations or replacements apparent to those skilled in the art within the technical scope provided by the present disclosure shall fall within the scope of protection of the present disclosure. Therefore, the scope of protection of the present disclosure shall be subject to the scope of protection of the claims.

What is claimed is:

1. A data transmission method, comprising:
   receiving, by a network device, data which is transmitted by a terminal device on multiple transmission resources without grant; and
   independently decoding, by the network device, the data on each transmission resource in the multiple transmission resources, wherein the each transmission resource comprises at least one resource unit, wherein an index number P of a starting resource unit in the each transmission resource meets P mod N=k, N being a quantity of resource units in the each transmission resource and k being a preset non-negative integer smaller than N.

2. The method as claimed in claim 1, before independently decoding, by the network device, the data on the each transmission resource in the multiple transmission resources, further comprising:
   receiving, by the network device on a specific time-frequency resource in the each transmission resource, decoding information used for decoding the data on the each transmission resource,
   wherein decoding, by the network device, the data on the each transmission resource in the multiple transmission resources comprises:
   independently decoding, by the network device, the data on the each transmission resource according to the decoding information used for decoding the data on the each transmission resource.

3. The method as claimed in claim 1, wherein the data on the multiple transmission resources belongs to a same Hybrid Automatic Retransmission Request (HARQ) process.

4. A data transmission method, comprising:
   independently encoding, by a terminal device, data to be transmitted on each transmission resource in multiple transmission resources; and
   transmitting, by the terminal device, the independently encoded data to a network device on the each transmission resource without grant, wherein the each transmission resource comprises at least one resource unit, wherein an index number P of a starting resource unit in the each transmission resource meets P mod N=k, N being a quantity of resource units in the each transmission resource and k being a preset non-negative integer smaller than N.

5. The method as claimed in claim 4, wherein the at least one resource unit is continuous or discontinuous in a frequency domain.

6. The method as claimed in claim 4, wherein the multiple transmission resources are continuous or discontinuous in a frequency domain.

7. The method as claimed in claim 4, before independently encoding, by the terminal device, the data to be transmitted on the each transmission resource in the multiple transmission resources, further comprising:
   determining, by the terminal device, positions of the multiple transmission resources according to an Identifier (ID) of the terminal device.

8. The method as claimed in claim 4, before independently encoding, by the terminal device, the data to be transmitted on the each transmission resource in the multiple transmission resources, further comprising:
   determining, by the terminal device, a position of at least one resource unit in the each transmission resource according to an ID of the terminal device.

9. The method as claimed in claim 4, further comprising:
transmitting, by the terminal device on a specific time-frequency resource in the each transmission resource, decoding information used for decoding the data on the each transmission resource to the network device.

10. The method as claimed in claim 9, wherein the decoding information comprises at least one of:
a Modulation and Coding Scheme (MCS) corresponding to the each transmission resource, precoding information corresponding to the each transmission resource, reference signal information corresponding to the each transmission resource, and a size of the each transmission resource.

11. The method as claimed in claim 4, wherein the data on the multiple transmission resources belongs to a same Hybrid Automatic Retransmission Request (HARQ) process.

12. The method as claimed in claim 11, wherein the data on the each transmission resource comprises at least one of:
a total quantity of the multiple transmission resources, index numbers of other transmission resources, except a current transmission resource, in the multiple transmission resources, and position information of the other transmission resources.

13. The method as claimed in claim 11, wherein the data on the multiple transmission resources comprises at least one common Cyclic Redundancy Check (CRC) code.

14. The method as claimed in claim 4, wherein the data on the each transmission resource in the multiple transmission resources belongs to an independent HARQ process.

15. The method as claimed in claim 14, wherein the data on the each transmission resource comprises at least one of:
information about a HARQ process number corresponding to data transmission on the each transmission resource;
position information of other transmission resources, except a current transmission resource, in the multiple transmission resources.

16. A terminal device, comprising:
at least one processor; and
a computer readable storage, coupled to the at least one processor and storing at least one computer executable instruction which, when being executed by the at least one processor, causes the at least one processor to carry out following actions:
independently encoding data to be transmitted on each transmission resource in multiple transmission resources; and
transmitting the independently encoded data to a network device on the each transmission resource without grant, wherein the each transmission resource comprises at least one resource unit, wherein an index number P of a starting resource unit in the each transmission resource meets P mod N=k, N being a quantity of resource units in the each transmission resource and k being a preset non-negative integer smaller than N.

17. The terminal device as claimed in claim 16, wherein the at least one computer executable instruction, when being executed by the at least one processor, causes the at least one processor to carry out following actions:
before the processing unit independently encodes the data to be transmitted on the each transmission resource in the multiple transmission resources, determining positions of the multiple transmission resources according to an Identifier (ID) of the terminal device;
or,
before the processing unit independently encodes the data to be transmitted on the each transmission resource in the multiple transmission resources, determining a position of at least one resource unit in the each transmission resource according to an ID of the terminal device.

18. The terminal device as claimed in claim 16, wherein the at least one computer executable instruction, when being executed by the at least one processor, causes the at least one processor to carry out following actions:
transmitting, on a specific time-frequency resource in the each transmission resource, decoding information used for decoding the data on the each transmission resource to the network device.

19. The terminal device as claimed in claim 16, wherein the data on the multiple transmission resources belongs to a same Hybrid Automatic Retransmission Request (HARQ) process.

* * * * *